United States Patent [19]
Hartung et al.

[11] 4,438,512
[45] Mar. 20, 1984

[54] METHOD AND APPARATUS FOR VERIFYING STORAGE APPARATUS ADDRESSING

[75] Inventors: Michael H. Hartung; Richard E. Rieck; Gerald E. Tayler, all of Pima County, Ariz.

[73] Assignee: International Business Machines Corporation, Armonk, N.Y.

[21] Appl. No.: 300,414

[22] Filed: Sep. 8, 1981

[51] Int. Cl.³ .............................................. G06F 11/00
[52] U.S. Cl. ...................................... 371/60; 364/900; 365/230
[58] Field of Search ...................... 371/38, 51, 57, 60; 365/200, 201, 230; 364/200, 900

[56] References Cited

U.S. PATENT DOCUMENTS

| | | | |
|---|---|---|---|
| 3,815,103 | 6/1974 | Holtey et al. | 364/200 |
| 4,174,537 | 11/1979 | Chu et al. | 364/200 |
| 4,292,674 | 9/1981 | Scheuneman | 365/230 |

*Primary Examiner*—Charles E. Atkinson
*Attorney, Agent, or Firm*—H. F. Somermeyer

[57] ABSTRACT

In a data storage system employing sequential data transfers for blocks of data bytes, an address offset is induced in the addressing mechanism such that each block transfer requires loading the address mechanism with an address of a block to be accessed. Address offset is preferably induced by inserting a blank register between adjacent blocks.

11 Claims, 4 Drawing Figures

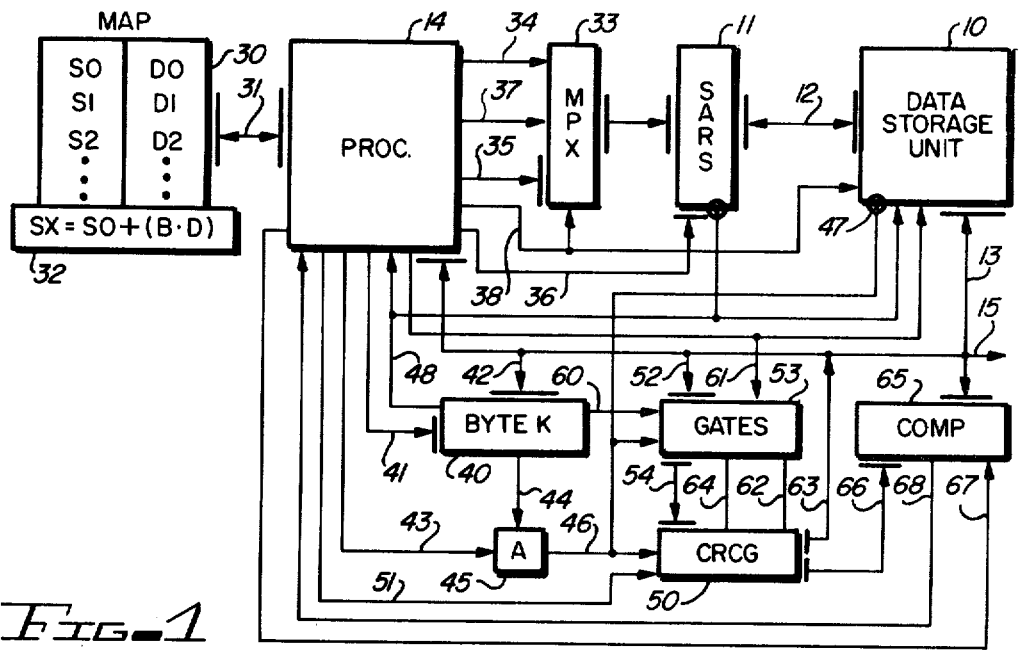
*Fig-1*
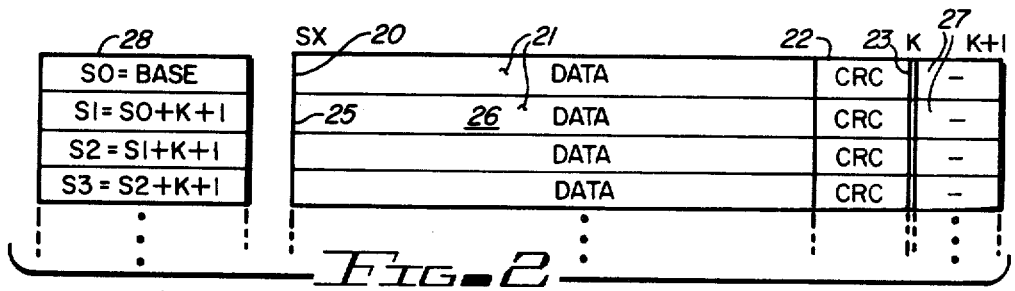
*Fig-2*
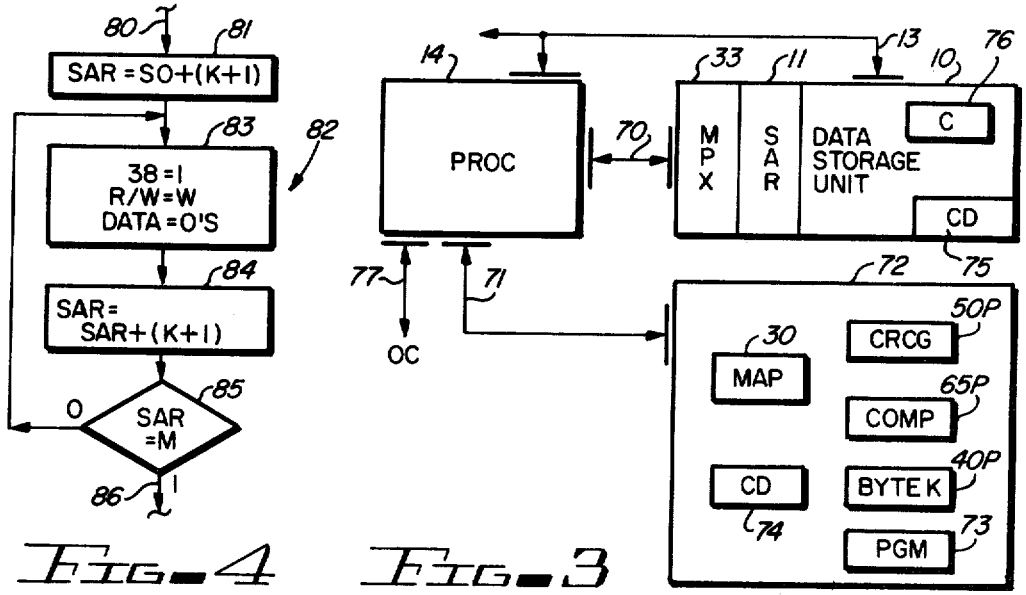
*Fig-4*  *Fig-3*

METHOD AND APPARATUS FOR VERIFYING STORAGE APPARATUS ADDRESSING

FIELD OF THE INVENTION

The present invention relates to data storage apparatus, particularly to methods of apparatus for verifying proper address operations.

BACKGROUND OF THE INVENTION

Random access volatile storage apparatus, such as semi-conductor device storage apparatus, have gained wide acceptance in the data processing industry because of low cost and high performance and cost. Access to registers within such semi-conductive data storage apparatus requires high speed address register selection circuits of diverse design. These circuits being high speed can be subject to errors. It is, therefore, desired to have various error checking schemes for ensuring that the addressing operations are error free.

Semi-conductor data storage apparatus are used as cache or buffering devices for peripheral data storage apparatus, such as direct access storage devices (disk storage apparatus). See Eden et al U.S. Pat. No. 3,569,938. In some applications of the transfer of data between disk storage apparatus and semi-conductor data storage apparatus and between semi-conductor data storage apparatus and host computers are in blocks of a large plurality of data signals, for example, 4,096 bytes of data. When the buffer is a designated portion of a larger data storage apparatus which can store other data including control data signals, then the blocks of data are stored in so-called allocated portions of the buffer. When transferring blocks of data, the transfer can become skewed with respect to the mapping of the blocks in the buffer; accordingly, the integrity of the data is destroyed by such addressing errors.

In some applications, such as paging and swapping applications, it is desired that the blocks of data within the buffer be logically independent. This logical independence is achieved by requiring that the address register driving the addressing circuitry for the data storage apparatus be loaded with a new address each time a block of data is to be stored in the data storage apparatus or fetched from the data storage apparatus. When such logical independence is not followed, error conditions can occur in the host system in that the logical relationships of the blocks of data as stored in the data storage apparatus have no relationship to the usage of such blocks of data by the host computer. Therefore, it is extremely important that the data storage apparatus independently access each block of data such that the logical relationship between the blocks of data in the data storage apparatus are maintained with respect to the logical characteristics of such data. This requirement can be easily achieved by requiring that the address register be loaded with a new address each time an area of the data storage apparatus is accessed for either recording data signals or reading data signals. A low cost and efficient error checking system is desired to ensure proper operation of such data storage apparatus.

SUMMARY OF THE INVENTION

In accordance with the invention, a checking method and apparatus is for a volatile random-access data storage unit having a first plurality of addressable registers. The addressable registers are allocated into groups of such registers; each group of registers capable of storing a predetermined amount of data. Each group of registers, in addition to storing the data, store an error detecting set of signals related to the data stored in the group plus a blank register for providing error checking. The addressing scheme is such that after reading the error detection signals, which are the last signals read or stored, the address structure points to the blank register. Then, if the address register is not loaded prior to the next access, the normally blank register is then accessed first inducing an address offset which is detected by error detection circuitry operating with the set of error detection signals.

In a given aspect of the invention, the addressing means for a random access data storage apparatus includes addressing means which cycles through a sequence of addresses. Upon completion of the sequence of addresses, means coupled to the addressing mechanisms force the addressing mechanisms to contain an address at the end of the sequence for a register which is noncongruent with the mapping of data in the memory. Any given subsequent access to the data storage apparatus not adjusting the addressing means away from the noncongruence results in a detected error, thereby indicating that there is an error in the addressing system or that the addressing system was not set prior to such given access to the data storage apparatus.

The foregoing and other objects, features, and advantages of the invention will be apparent from the following more particular description of the preferred embodiments of the invention, as illustrated in the accompanying drawings.

DESCRIPTION OF THE DRAWING

FIG. 1 is a diagrammatic showing of a data storage system employing the teachings of the present invention.

FIG. 2 is a data structure map showing the mpping of data in a data storage unit of the FIG. 1 illustrated data storage system.

FIG. 3 is a diagrammatic showing of a preferred implementation of the FIG. 1 illustrated data storage system.

FIG. 4 is a machine operations chart showing initialization of a data storage unit used in the FIG. 1 illustrated data storage system.

DETAILED DESCRIPTION

Referring now more particularly to the drawing, like numerals indicate like parts and structural features in the various diagrams. FIG. 1 diagrammatically illustrates a data storage unit 10 operated in accordance with practicing the invention. Data storage unit 10 includes a large plurality of addressable data storage registers (not individually shown), such as more than one million of such registers. Each register is capable of storing at least one byte of data and preferably a plurality of bytes of data, such as 4, 8 or 16 bytes of data. Access to the data storage unit is via an addressing mechanism within the unit 10 of known design. That addressing mechanism or register selection system receives memory addresses from one or more storage address registers SAR 11 via an address bus 12. When a plurality of address registers 11 are used, one and only one of the address registers is activated during a given access to data storage unit 10 or in a sequence of such accesses, as will become apparent. Data flow to and from data storage unit 10 is through bidirectional data bus 13 and is controlled by digital processor 14. Arrow 15 indicates that bus 13 is connected to other units, not shown. Processor 14 is programmed to operate data storage unit 10 to provide checking on the operation of SAR 11 as well as a desired protocol in accessing data storage unit 10.

Data storage unit 10 is preferably used as a buffer storage to a direct access storage device (not shown) containing many megabytes of data. It is also preferred that the transfer of data between the direct access storage device and a data storage unit and a user (not shown) is in blocks of data, for example 4,096 bytes of data. When data storage unit 10 addressable data storage registers contain four bytes of data, then one block of data being transferred will occupy 1,024 of such registers for an 8-byte register, 512 registers store one block of data. Processor 14 activates a selected SAR 11, which is also an address counter, to count through a predetermined number of addressable registers for transferring a block in a sequence of accesses to consecutively addressed data storage registers.

Operation of the invention within the FIGS. 1 and 3 illustrated storage system is best understood by referring next to FIG. 2. FIG. 2 illustrates addressing and checking using the above-described fixed-block data transfer. The invention can also be applied to variable size blocks, as will become apparent. The address base of data storage unit 10 for each block of data begins at a reference address for a predetermined addressable data storage register as at 20 and also denominated as storage address SX. The 4,096 byte data blcok is stored in registers represented by the address space 21. Error detection for ensuring data integrity includes a CRC (cyclic redundancy check) residues stored in registers 22. In a constructed embodiment of the present invention, the CRC in registers 22 contained two bytes which means that the remaining bytes in the addressable register are all zeros. Accordingly, instead of 1,024 4-byte registers, 1,025 4-byte registers are used to store a 4,096 byte block of data. This figure is represented by the letter K as denoting the number of registers of data storage unit 10 used to store the data in area 21 and the CRC in registers 22 and represented as address 23. Using known memory allocation techniques, the address in SAR 11 at K would correspond to the address 25 for the data block 26, the next read or accessed consecutive block of data in data storage unit 10. Allocation of data in data storage unit 10 has no relationship to the user application of that data; i.e., allocation of registers for storing blocks of data in data storage unit 10 are based upon efficient usage of the data storage unit 10 rather than the logical relationships as they may exist between various stored blocks of data. Accordingly, a next access to data storage unit 10 without loading a new address into SAR 11 would read data block 26 beginning at address 25. In this situation there is no way to check whether or not data block 26 is the one desired to be read or the area to be written into by processor 14. In this manner data integrity of data storage unit 10 is exposed and needs to be controlled.

In accordance with the present invention, after accessing each group of addressable storage registers an address offset is introduced into SAR 11 such that if SAR 11 does not receive a new address each time a block of data is to be accessed, then a set of registers in data storage unit 10 are accessed which are not contiguous between addresses 20 and 23, for example. As such the CRC residue stored in register 22, which corresponds respectively to the data stored in areas 21, indicates an error condition when the data is not read as a unit congruent to the data storage mapping of data storage unit 10. Accordingly, an error condition is then detected indicating some sort of error. Reconstructing what had happened, a diagnostic program (not shown) determines that the last address in the SAR 11 controlling the access to a block of data is at an address other than at 23; this offset address indicates an error in SAR 11 incrementing or the fact that the SAR 11 was not first properly loaded with an address to access data storage unit 10.

While the present invention contemplates any form of address offsetting for practicing the broad aspects of the invention, a specific form of the invention is novel, in and of itself, and provides a substantial advantage of extremely low cost; particularly, with present day low-data-storage costs. This address offsetting is provided by interleaving a blank register between each of the storage areas of data storage unit 10 which stores a block of data together with its appended CRC residue stored in registers 22 respectively. Then, instead of K registers storing a block of data, K plus 1 registers store a block of data. The address contained in SAR 11 upon completion of a transfer of a block of data to or from data storage unit 10 points to one of the blank registers 27 immediately following the just-accessed data area within the address space. Then, if a memory reference is made to data storage unit 10 without first loading a new address into SAR 11 corresponding to SX, an offset in addressing occurs such that instead of reading a complete block of data together with a CRC, only the blank register plus data is read with no CRC. Then the last several bytes of data will go into a later described CRC generator and compare circuits/programs result in a data error being detected. Since the address contents of SAR 11 point to an offset address, diagnostic procedures of usual design can quickly pinpoint the cause of the data error as being an induced address offset.

The value of SX for each block of data is shown in table 28. A base address SO identifies the first data area 21. The next consecutive or second data area 26 has a value SX identified as S1=SO plus the number of registers for storing a block of data including the CRC residue, K, plus 1. Subsequent start values S2, S3 and so forth are similarly calculated for fixed block size data storage transfers.

The machine operation charts below illustrate a sequence of machine operations for implementing the invention. In the illustrated system of FIGS. 1 and 3, the line and bus enumeration in the operation charts refer primarily to the FIG. 1 illustration as that is a more detailed showing of practicing the invention; the chart applies equally to the FIG. 3 illustration.

MACHINE OPERATION CHARTS

1. WRITE DATA TO CACHE
  Load SSAR-X via MP X 33
    Line 34 active
    Bus 35 SSAR select
    Bus 36 SSAR contents
  Clear CRCG
    Line 51 active
  Move Data
    Bus 13 carries data
    Line 61 shows write
    Bus 41 set Byte K 40 to K
    Line 44 becomes active Line 43 active
Line 46 becomes active
Line 48 becomes active
Logic OR generates bus 42 carries byte counts to Byte K 40
Gates 53 pass bus 13 contents to CRCG 50
Store CRC (Byte K=1)
Line 60 active
Line 62 becomes active
Bus 63 carries CRC to bus 13

1A. OPTIONAL POST-WRITE CHECK
Read Sx+K−1
Load SSAR-Y
Activate line 61 to read
Activate line 38
Send CRC's over buses 13 and 66
Compare
Activate line 67
Sense line 68

2. READ DATA FROM CACHE
Load SSAR-X via MPX 33
Clear CRCG
Move data
Line 61 shows read
Read CRC
Line 64 becomes active
Line 62 is not active
Send CRC's over buses 13 and 66
Compare Referring next to FIG. 1, map 30 shows a generalized allocation map of data storage unit 10 for practicing the present invention with known but variable-length data blocks. A base address SO has a data length, including the address offset DO, such that S1=SO+DO. In a similar manner the second data block to be stored with a starting address S1 has a length D1 such that beginning address S2=S1+D1. The map 30 continues in this manner such that an empty or blank register occurs between consecutive ones of the variable-length data blocks stored within data storage unit 10. Map 30 is accessed via bidirectional bus 31 by processor 14. Typically map 30 is resident in a control store, such as described later with respect to FIG. 3. Equation 32 shows that for a fixed block length architecture any beginning address SX=SO+the product of the number of blocks B times the number of registers D required for storing a block for determining the beginning address of any block of data. SO is the first address, B is the relative address of the block to be addressed and D is the number of registers required in each block for storing the data and CRC plus the blank register. Processor 14 uses map 30 for accessing data storage unit 10 and for allocating data blocks to the various storage areas of data storage unit 10.

It is preferred that data storage unit 10 be accessed via any one of a plurality of SARs 11. This is achieved through the use of a multiplexing circuit 33 being interposed between SARs 11 and processor 14. Line 34 carries a load SAR instruction to MPX 33 which responds to the SAR address on bus 35 to select the SAR 11 to be loaded with the signal contents of bus 36 which is supplied to all SARs 11. The usual gating circuits (not shown) gate the contents of bus 36 to the selected SAR 11 indicated by the signal on bus 35 whenever line 34 is active. Bus 36 carries the beginning address SX for data storage unit 10 for a sequence of a block of data transfers as well as a single address for the later described single data storage register access. Line 37 when active indicates through MPX (multiplexer) 33 that a block of data is to be transferred from data storage unit 10 or to data storage unit 10 beginning at the SX contents of the SAR 11 indicated by the signals transferred over bus 35. A selected SAR 11 then is a storage address counter which is automatically incremented each time data storage unit 10 cycles for reading or writing from or to an addressable one of the data storage registers. When line 38 is activated by processor 14, a single data storage register is accessed at the address indicated in the SAR 11 identified by bus 35 address signals. Line 38 extends to data storage unit 10 to indicate the single data storage register access.

For a block transfer, processor 14 first loads byte counter (K) 40, which is a down counter to value K such that the final address in SAR 11 is K+1. Byte count presetting is provided by signals supplied by processor 14 over bus 41 to indicate the number of data storage registers to be accessed in the next sequence. Each time a byte is transferred over bus 13, a logical OR circuit, embedded but not shown, in bus portion 42 decrements byte counter 40. That is, the data storage unit 10 stores a data byte with odd parity such that each time a byte is transferred over bus 13 at least one of the bits, including parity, will be unity; i.e., is a pulse. Therefore, one bit of the data byte is used to clock byte counter 40. Other decrementing techniques such as used in program processes may be also employed. Line 43 carries a signal from processor 14 signifying a sequential data transfer command. Byte counter 40 supplies a nonzero indication over line 44 to AND circuit 45 which passes the sequential data command signal to line 46 for signifying a sequential data transfer to data storage unit 10 as indicated by small circle 47. This action causes data storage unit 10 to cycle as if it were operating in an automatic data transfer function. The byte counter 40 also supplies a signal over line 48 to processor 14 and the SAR 11 that was selected for indicating the addresses of the sequential data transfer and to data storage unit 10 for signifying that the remaining byte count is greater than K−1, i.e., the CRC 22 has not yet been read from or transferred to storage unit 10. CRCG 50, a cyclic redundancy check generator, is enabled by the signals on line 46. Processor 14 before initiating data transfer, clears CRCG 50 by sending a signal over line 51. Each data byte, including parity, transferred over bus 13 in either direction also travels over bus 52 through gating circuits 53; thence, bus 54 to CRCG 50. Gating circuits 53 respond to later described controls for performing well-known gating functions not detailed because they are so simple. For example, byte counter 40 supplies a signal over line 60 to gating circuits 53 for coupling bus 52 to bus 54 whenever the byte count is not greater than K−1, which signifies end of the data block. Line 61 extending from processor 41 indicates to gating circuits 53 and data storage unit 10 whether the operation is read or write, i.e., data transfers respectively from data storage unit 10 or to data storage unit 10. Gating circuits 53 respond to the line 61 signal and to the line 60 signal to supply an activating signal over line 62 which causes CRCG 50 to send the accumulated CRC 22 via bus 63 to bus 13 for recording in data storage unit 10. This action stores the generated CRS 22 at address K−1 with respect to each of the transferred blocks of data.

At this time an optional check-after-write may be employed. Processor 14 supplies the address K to a selected SAR 11 and then activates line 38 to read out the register for comparing such contents with CRCG 50 contents in compare circuits 65. Contents of CRCG 50 are supplied over bus 66 while compare circuits 65 receive the stored CRC from bus 13. Line 67 receives a compare activate circuit from processor 14 and supplies a compare result over line 68, i.e., identity or nonidentity. Nonidentify indicates an error condition.

For a read operation from data storage unit 10, gating circuits 53 respond to the read indicating signal on line 61 and to the end of data signal on line 60 to activate line 64 causing CRCG 50 to send a generated CRC over bus 66 to compare circuits 65. Compare circuits 65 receive the stored CRC data from data storage unit 10 over bus 13. Processor 14 then activates compare 65 via line 67 to compare the stored CRC with the generated CRC to ensure that the data was properly read from data storage unit 10.

FIG. 3 illustrates a programmed implementation of the invention which includes processor 14 and data storage unit 10. A bus 71 couples processor 14 to control store 72 which stores programs for implementing the functions described with respect to FIG. 1. Map 30 is stored in control store 72, as is CRCG program 50P, compare program 65P, byte counter 40P as well as other programs 73. For higher data rates in a programmed implementation at low cost, items 40, 50 and 65 are electronic circuits controlled by digital processor 14. A portion of a directory for data storage unit 10, when operated as a cache, is stored in control store 72 for rapid access by processor 14. The actual directory is sufficiently large that it is stored in area 75 of data storage unit 10. A portion of data storage unit 10 is designated as a cache C 76 which designates the large plurality of addressable data storage registers. Processor 14 is connected to other components OC via bus 77. The various FIG. 1 illustrated components 40, 44, 53, 50 and 65 are all programmed components within control store 72. Operation is as shown in the machine operation charts.

Initialization of data storage unit 10 cache portion C 76 requires that the designated blank or empty registers identifiable through map 30 or address table 28 are reset to all zeroes. This reset is achieved by a program in control store 72 illustrated in FIG. 4 as well as by the same program in processor 14 in FIG. 1. The program is a portion of the initialization procedure associated with a power-on resets (POR). The portion of interest of POR begins at logic path 80 wherein step 81 causes a given SAR 11 to be set to the address SO+K+1, i.e., the location of the first blank register 27. This action initializes the loop 82 for clearing all of the registers 27. At 83, line 31 is activated and read/write line 61 is set to write with the data on bus 31 being set to all zeroes. Then, at 84 the address is indexed such that the given SAR 11 contains the previous contents of the given SAR as modified by the value K+1. Then at 85 processor 14 examines to see whether or not all of the registers 27 have been cleared, i.e., the value of SARs is equal to M which is the address of a register beyond the last blank register 27. If this is the case, exit is taken at 86 to continue the POR initialization process. Otherwise, the return is made to repeat steps 83, 84 and 85 until all registers 27 have been cleared. At this point data storage unit 10 has been initialized for practicing the invention which then allows the cache directory 75 to be built.

The preceding description shows a most efficient way of handling address offsets. A secondary way to induce an address offset is to increment SAR 11 by unity upon the completion of each sequential data transfer. Another procedure is to design data storage unit 10 to have a given number of registers within an address space for containing one block of data. Then, a void in the address space can be provided such that addressing the void causes an error condition. While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of operating a volatile random access data storage unit including a first plurality of addressable data storage registers;

the steps of:
allocating said first plurality of addressable registers into a second plurality smaller than said first plurality of groups of said addressable registers, each group having a given number of said addressable registers;
addressing each of said groups of addressable registers as a single group and accessing individual ones of said addressable registers in said group in a predetermined sequence including all but a last one of said addressable registers that would be next accessed by any reference to said data storage unit;
initializing the signal state of all said last one addressable registers in a given reference state; and
before accessing said addressable registers in said data storage unit, presetting an address for a group to be accessed for enabling said predetermined sequence such that said last one addressable registers are never normally accessed whereby any access to said one addressable registers indicates one error condition.

2. The machine-implemented method set forth in claim 1 further including the machine-executable steps of:
storing data signals in a one of said groups and including error detection signals as a part of said stored data signals; and
storing said error detection signals in a second one of said addressable registers to be accessed in said predetermined sequence as the address immediately preceding said last one addressable register.

3. The machine-implemented method set forth in claim 1 or 2, further including the steps of:
storing on error detection set of signals in each said group of addressable registers for data signals stored therein;
transferring data signals between said data storage unit and another unit and generating a second error detection set of signals for data signals transferred with a given one of said groups of addressable registers;
reading said stored error detection set of signals from said given group of addressable registers and comparing same with said second error detection set of signals; and
upon a miscompare signal an error condition.

4. A volatile data storage unit including an error-checking arrangement and having a plurality of addressable data storage registers;
comprising:
means coupled to said plurality of addressable data storage registers for indicating allocated numbers of said addressable registers as allocation groups of said addressable registers which occupy a given range of addresses identifying corresponding ones of said addressable registers in respective ones of said groups;

means coupled to said plurality of addressable data storage registers for receiving two of said addressable registers at one end of said range of addresses in each of said groups for non-data control, an ultimate one of said two registers corresponding to a last address of said range in each of said groups and for containing reference signals and a penultimate one of said two registers corresponding to a penultimate address of said range in each of said groups for containing error detection signals relating to data signals stored in said addressable registers in said respective group; and addressing means coupled to said means for indicating and to said plurality of addressable data storage registers for addressing said addressable registers including means normally preventing addressing said ultimate register after given accesses to said addressable register.

5. A data storage apparatus having a settable address counter capable of addressing a first plurality of addressable registers in the data storage apparatus;

the improvement including in combination;

allocation means coupled to said first plurality of addressable registers and to said address counter for establishing a data addressing map of a second plurality less than said first plurality of groups of said addressable registers, all registers in each group being addressable in a sequence of consecutive addresses counted in said address counter;

means coupled to said address counter for cycling said address counter through said sequence of consecutive addresses;

means coupled to said address counter for forcing said address counter to contain an address at the end of each of said sequences of consecutive addresses from an address of a first addressable register in a contiguously addressed group of said addressable register such that failure to set said address counter prior to accessing registers of the data storage apparatus results in an unintended sequence of accesses to said addressable registers not in congruence with said groups; and means coupled to said address counter and said coupled means for detecting said unintended sequence and having further means for being responsive to said unintended sequence to indicate an error condition.

6. The machine-implemented method of operating a volatile random-access storage apparatus having a first plurality of addressable data-storage registers; the automatic steps of:

allocating said first plurality of addressable data-storage registers into a second plurality less than said first plurality of addressable groups of said registers in accordance with a given allocation map of addresses;

accessing by activating addressing means to address said addressable data storage registers in each of said groups in a sequence of consecutive addresses such that all of said addressable data storage registers for containing data signals are accessed as a single group;

upon completion of each said accessing inducing an address offset in said addressing means such that any next access to said addressable data-storage registers without setting a new address into said addressing means results in accessing ones of said addressable data-storage registers which are incongruent with said allocation map; and detecting and indicating said incongruence as an error condition.

7. Data processing apparatus including storage (10) accessed by a continuous spectrum of physical addresses, each address being for a respective addressable data storage location and a processing system (14) operative in a corresponding continuous spectrum of system addresses and a mechanism for mapping system addresses by block into physical addresses by block and into corresponding system addresses by block;

characterized in that:

as a fault detection indicator, for each block of addresses, the physical block capacity of addressable data storage locations is greater than its system block capacity of addressable data storage locations and that the excess of the addressable data storage locations lies at that end of each such block reached last under an address indexing operation of the system.

8. Apparatus as claimed in claim 7 wherein each said excess is zeroed.

9. Apparatus as claimed in claim 8 wherein each said excess stores detectable control information.

10. Apparatus as claimed in claim 7 including an error code generator and detector, said excess having two addressable locations per block arranged to generate on writing an error code word for the block and load the same into the first of the two excess locations, the second of the two excess locations containing either detectable control information or being maintained empty.

11. Apparatus as claimed in claim 10 in which each stored block includes error-indicating redundancy, the arrangement being such that, on reading, the redundancy said block is compared with the excess location error word.

* * * * *